United States Patent [19]

Fernando

[11] Patent Number: 5,203,995
[45] Date of Patent: Apr. 20, 1993

[54] FILTER FOR MACHINE TOOL

[76] Inventor: Martinez M. Fernando, Larrasoloeta, 5, 48200 Durango, Spain

[21] Appl. No.: 919,084

[22] Filed: Jul. 23, 1992

Related U.S. Application Data

[63] Continuation of Ser. No. 644,578, Jan. 23, 1991, abandoned.

[51] Int. Cl.$^5$ .............................................. B01D 24/14
[52] U.S. Cl. ..................................... 210/274; 210/279; 210/289; 210/290; 210/291; 210/500.1
[58] Field of Search ............... 210/263, 274, 279, 289, 210/290, 291, 293, 500.1

[56] References Cited

U.S. PATENT DOCUMENTS

| | | | |
|---|---|---|---|
| 3,451,554 | 6/1969 | Wade | 210/279 |
| 3,552,572 | 1/1971 | Lehmann | 210/290 |
| 3,625,365 | 12/1971 | Armstrong | 210/289 |
| 3,653,845 | 4/1972 | Moravec | 210/293 |
| 3,826,375 | 7/1974 | Fournier | 210/289 |
| 4,322,299 | 3/1982 | Scholten et al. | 210/290 |

FOREIGN PATENT DOCUMENTS

| | | |
|---|---|---|
| 984997 | 3/1965 | United Kingdom . |
| 1056532 | 1/1967 | United Kingdom . |
| 1073949 | 6/1967 | United Kingdom . |
| 1110559 | 4/1968 | United Kingdom . |
| 1460396 | 1/1977 | United Kingdom . |
| 2159429 | 12/1985 | United Kingdom . |

*Primary Examiner*—Matthew O. Savage
*Attorney, Agent, or Firm*—Lucas & Just

[57] ABSTRACT

A filter for a machine tool operative to filter one of steel, brass, and copper from a liquid agent is disclosed herein. The filter consists of a cylindrical container having a closed top end and a closed bottom end, an upper duct positioned near the top end of the container, a lower duct positioned near the bottom end of the container and having a lower diffuser fluidly connected thereto, and a filtering element surrounding the lower diffuser. The filter element consists of ilmenite particles having a density (d) of about 6 g/cm$^3$ and a size ranging between a smallest size of about 0.2 mm and a largest size of about 1.0 mm, the ilmenite particles being in the form of grains having sharp edges and irregular sized faces.

10 Claims, 1 Drawing Sheet

FILTER FOR MACHINE TOOL

This is a continuation of application Ser. No. 644,578, filed Jan. 23, 1991, now abandoned.

Operation in machine tools with chip removal or electrical discharge work is carried out in a cooling, lubricating, dielectric or petrochemical liquid agent, that is to say, there is an intervention of the steel, brass, copper petroleum, or graphite present through heat or on producing the relevant discharges, originates a series of particles of complex chemical products, causing contamination of the agent and the need for their elimination.

In a standard type filter a container is provided with an inlet for the liquid to be filtered, the container having a filter element inside and an outlet for filtered liquid (filtration phase). When the filtering element becomes saturated, liquid is introduced through the inlet and regenerates the filtering element the resultant liquid discharging through the inlet (washing phase).

In normal technique two problems have been noted:

In the filtration phase the filtering element is contaminated and the duration of this phase is extremely short owing to the rapid saturation of the filtering element.

In the regeneration of the filtering element, part of the filtering element is lost, so that it has to be replaced, leading to obvious expense and inconvenience;

The purpose of this patent is a new filter design which avoids the problems as cited.

The various contaminating particles have been examined in the laboratory, and they are metallic or of complex formulation, with various shapes, many of them being spherical.

Various materials have also been investigated to research their filtering properties and the characteristics or basic variables which govern the process during the various phases of the filter operation.

Among other products those derived from silica have been examined, but did not give good results where the filtered liquid carries complex particles, for instance, petro-chemical or organic particles, which also appear frequently in the case of the usual cooling and lubricating fluids. Good results were even less evident where the medium is petroleum in an electro-erosion machine.

The various iron minerals also fail to give good results and progress has been made to solve problems with crushed bronze.

From the various tests it has been concluded that a good filtering element must be governed by three basic properties:

a) The density (d) must be high, in excess of 3 g/cm$^3$ and preferably above 5 g/cm$^3$; in particular, 6 to 8 g/cm$^3$ b) crushed materials of a mesh size (t) no smaller than 0.2 mm and no greater than 1 mm should be used;

c) the crushing should produce grains with sharp edged faces.

Ilmenite has been used for many hours as a filtering agent with optimum results.

Ilmenite is a high weight mineral, its density being of the order of 6 g/cm$^3$; the material being easily broken and of prevailing rhombohedric and hexahedric shapes. After the material is obtained in the raw form it is crushed and screened, obtaining grains with many sharp edges and irregular faces of dimensions from 0.3 to 1 mm between the most widely separated points. Its highest percentage measurement varies around 0.4 mm, filling the middle volume of the filter and 0.75 mm at the bottom of the filter.

Quite apart from the advantages obtained and derived from its geometric configuration as outlined, attention is also drawn to its high density, which is translated into a given compression and consequently greater stability of the grain. This ensures the absence of extensive modifications within the cavities as they form (excepting on the surface).

In experiments with other known filter grits derived from quartz, silica and others of a specific gravity below 3 g/cm$^3$, pump stoppage presupposes a sudden grit decompression, all the higher as the differential pressure is high. The same can be said for edge imapct produced during operation, so that movement of the grit causes the cavities to undergo modifications of such a nature particles lodged therein escape from the filter, causing deterioration in the quality of the filtered liquid and allowing the formation of connecting paths between the upper and lower diffuser which impede the filter liquid. With regard to the filtering element the filter has also been developed as a component part.

Figure 1:
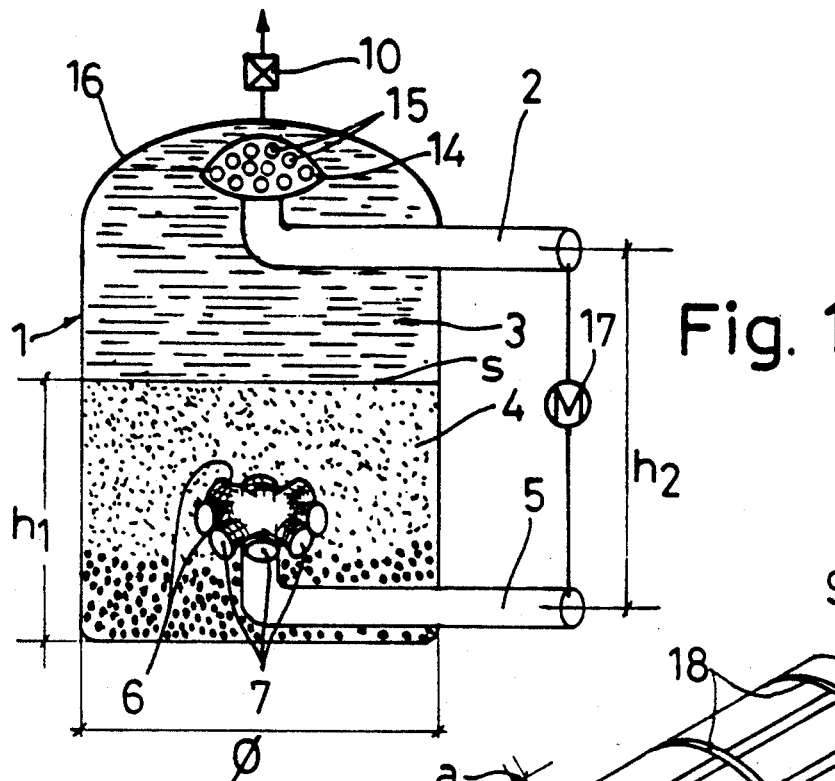
FIG. 1 is a schematic view of the filter object of the invention.
Figure 2:
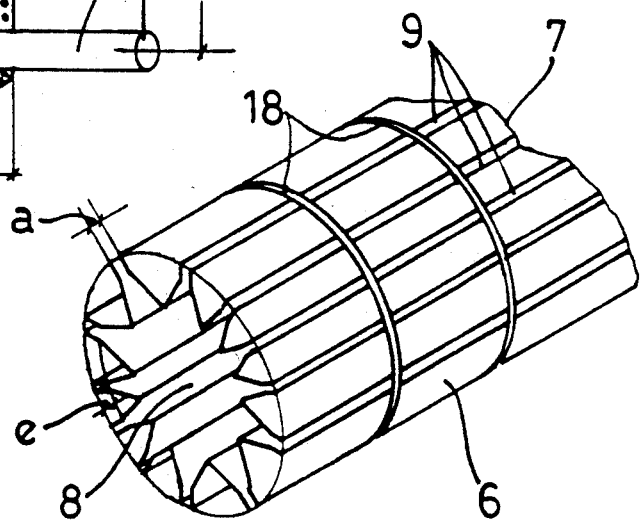
FIG. 2 is a schematic view of a lower diffuser tube.

The filter consists of a cylindrical container (1) comprised of two outlets connected on the inside to two upper (2) and lower (5) tubes with diffusers. The vertical position is preferred although it will also operate in other positions.

The upper diffuser (14) is located in the highest part of the filter container (1) (close to the plug (16)) and in the central zone consists of a hemispherically shaped component which in the curved surface has the perforations (15) required for equal distribution of the fluid (3). Its purpose is to provide liquid to be filtered (3) while preventing the generation of turbulence, vortices, etc. which disturb the surface of the filter grain (S) located at a distance from the upper diffuser of at least 1/6th of the total height (h$_2$) between the longitudinal axes of the upper and lower tubes. Through it also the filtered particles are dislodged when the liquid flow is reversed. The expansion undergone in this cycle of the filter elements is absorbed by the distance at which these are located in relation to the diffuser (14), from which it is deducted that the rising force of the liquid at the time of washing removes the filtered, particles not the filtering particles, as a result of their size and their weight.

The contaminating particles are retained in the filter element (4) but it will be gradually obstructed by those particles. At the bottom of the filter (1) a diffuser is located consisting of a series of tubes (6) with a grid component in star formation.

The tube (6) may have a closed end (7) and a number of reinforcement rings (18).

The tubes (6) have serrations (9) or grooving allowing the passage of the fluid from the filter zone (4) to the inside (8) of the tube (6), the said inside (8) opening out into the lower tube (5) of filter (1).

The width (a) of the serration striations (9) is smaller than the size of the filtering particles.

Serrations (9) are of minimal length (e) with parallel walls from which they spread towards the inside (8) of the tube.

In order to avoid air under pressure remaining in the upper part of the filter, an air purge (10) is provided.

The operation of the filter comprises three completely different actions: filtering, washing and rinsing, as described below.

Filtering phase: In this phase the foul liquid (3) coming, for instance from an electro erosion machine is pumped towards the filter container (1) through the upper diffuser (14). This distributes upwards and equally the liquid thus received creating a downwards uniform movement of the volume between the upper diffuser (14) and the ilmenite surface (S), passing through it and leaving particles contained therein so that once filtered, they may be received by the collectors of the lower diffuser and through it go to the outside.

When the process are repeated without interruption, the cavities or porosity formed in the ilmenite is saturated with particles, as indicated by a pressure gauge (17) interposed in the circuit and showing the differential pressure between the upper inlet and the lower outlet (5) giving rise to the washing cycle.

Filter washing: During this process the liquid from the pump enters the container through the lower diffuser creating a rising current which removes the particles deriving from external erosion through the upper diffuser (14), at the same time as the grit filtering expands and selects according to its filtering mesh size, so that the coarser grit remains in the deepest zone of the filtering end and the finest is found on the surface.

Rinsing of the filter: In this process the liquid enters through the upper diffuser (14) and goes out through the outlet (5) stabilising and compressing the filtering elements (4) and generating a new arrangement of its cavities once more arranged to receive the particles derived for instance from the electro erosion.

Figure 3:
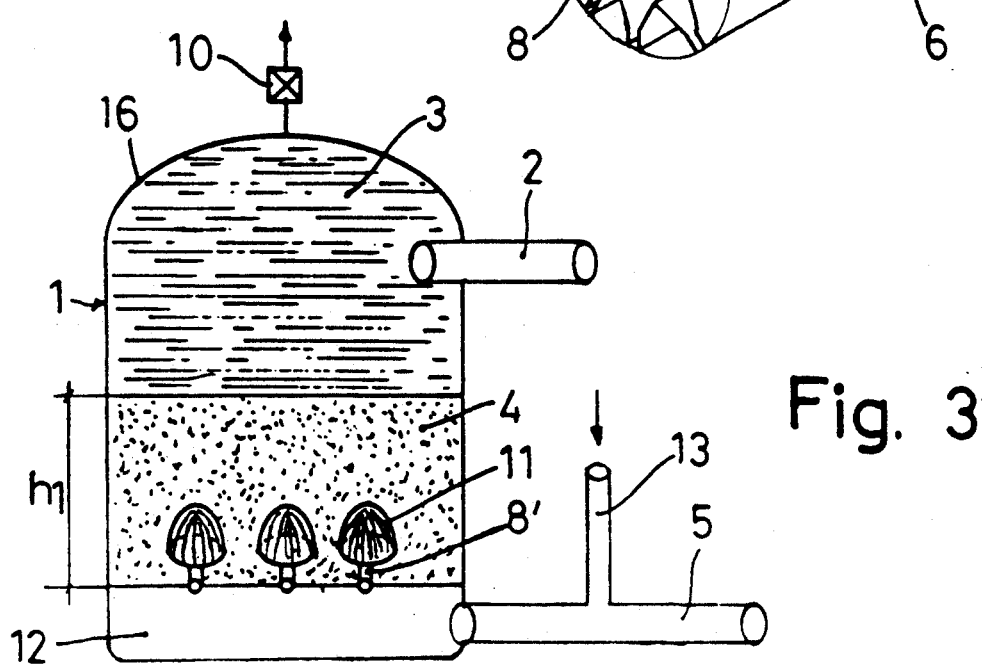
FIG. 3 is a schematic view of another practical version of the filter object of the invention.

In FIG. 3 it will be seen that instead of tubes (6) a number of grooved hemispheres (11) are arranged as the lower diffuser, the inside (8') of which opens out into a lower chamber (12) than the one from which the lower duct (5) proceeds.

Both in the washing and rinsing phases, it may be useful to to ensure counterflow not only of the liquid, but also of air, for which reason FIG. 3 shows a split air inlet line (13) facilitating removal of contaminating particles from the filtering element (4) right up to the upper duct (2). The air duct may open out into other points allowing the proposed purpose, for instance directly into the lower chamber (12).

The lower chamber (12) may be separated from the filtering element (4) by a grid or other, of which the grooves fullfill the purpose described for the tubes (6) or hemispheres (11).

It has been established experimentally that the filter operates satisfactorily under a head of filtered liquid (Q) with a filter area (S) retaining an approximate ratio of: $25 < Q/S < 40$ m$^3$/h-m$^2$ and preferably of $30 < Q/S < 35$ m$^3$/h-m$^2$, using filter having the specified properties.

The height ($h_1$) of the filter bed is approximately equal to the diameter $\phi$ of the filter, using an impulse pump only.

These properties will vary according to the type of pump during the various processing phases, but since the filter operates satisfactorily with a single pump, it is considered that the use of several pumps is a disadvantage.

As already indicated, the upper diffuser (14) is located in the vicinity of the plug (16), so that in practice there is an approximate overall total height of $h_2 = 1.2 h_1$.

To facilitate correct metering to each filter, two types of grain in separate bags are available, being 0.6 to 1 mm which is first introduced to a depth of some 10 cm above the lower diffuser then adding the smaller grit which varies between 0.3 and 0.6 mm, leaving without cover at least 1/6th of the total height of the container as already previously mentioned.

It is considered in view of the small differences, that the distance between diffusers is the same as between the inlet duct (2) and outlet duct (5).

I claim:

1. A filter for use with a machine tool, operative to filter at least one of steel, brass, and copper from a liquid agent, the filter consisting of:
    a cylindrical container having a closed top end and a closed bottom end;
    an upper duct positioned near the top end of the container;
    a lower duct positioned near the bottom end of the container and having a lower diffuser fluidly connected thereto;
    a filtering element surrounding said lower diffuser, the filtering element having a diameter $\phi$, the filtering element having a first surface adjacent said top end and a second surface adjacent said bottom end, the filtering element consisting essentially of ilmenite particles having a density (d) of about 6 g/cm$^3$ and a size (t) ranging between a smallest size of about 0.2 mm and a largest size of about 1.0 mm, said ilmenite particles being in the form of grains having sharp edges and irregular sized faces;
    the distance ($h_2$) between the said upper and lower ducts being at least 1.2 times the height ($h_1$) of the filtering element; and
    the upper duct having an upwardly directed diffuser of hemispherical shape facing said top end of the container, the upwardly directed diffuser having outlet holes therein and being situated at said distance ($h_2$) from said lower duct and being at least one-sixth of the distance ($h_2$) from said second surface of the said filtering element.

2. Filter for a machine tool, according to claim 1, wherein said lower diffuser consists of a grooved element, the width of each groove being smaller than said smallest size.

3. Filter for a machine tool, according to claim 2, wherein the grooves expand towards an inside of the grooved element.

4. Filter for a machine tool, according to claim 3, wherein the grooved element is a series of tubes placed in a star-shaped formation.

5. Filter for a machine tool, according to claim 3, wherein the grooved element is in the form of a plurality of hemispheres communicating with a compartment adjacent said first surface of the filtering element to which the lower duct is connected.

6. Filter for a machine tool, according to claim 1, wherein the height ($h_1$) of filtering element in the filter is approximately equal to the diameter $\phi$ of the filtering element.

7. Filter for a machine tool, according to claim 1, wherein an air duct is connected to the lower duct for back-washing the filtering element.

8. Filter for a machine tool, according to claim 1, wherein the filter is operated in different operating phases and a differential pressure gauge is fluidly connected between the upper and lower ducts, the pressure gauge being operable to detect the different operating phases.

9. Filter for a machine tool, according to claim 1, wherein the filter has a filter area (S) and a head of filtered liquid (Q) is provided in accordance with the equation $25 < Q/S < 40$ m$^3$/h-m$^2$.

10. A filter for a machine tool, according to claim 1, wherein the filtering element includes a first layer of ilmenite particles adjacent said first surface having a size of about 0.4 mm, and a second layer of ilmenite particles adjacent said first layer and said second surface having a size of about 0.75 mm.

* * * * *

UNITED STATES PATENT AND TRADEMARK OFFICE
CERTIFICATE OF CORRECTION

PATENT NO. : 5,203,995

DATED : April 20, 1993

INVENTOR(S) : Fernando Martinez-Mugica

It is certified that error appears in the above-identified patent and that said Letters Patent is hereby corrected as shown below:

On title page, item [76], should read

--Fernando Martinez-Mugica--

Item [19], should read --Martinez-Mugica--

Column 2, line 15, change "imapct" to --impact--;

line 17, after "nature" insert --that--;

line 51, change "filtered, particles" to

--filtered particles,--.

Column 3, line 17, change "are" to --is--;

line 18, change "is" to --are--;

line 36, after "instance" insert --,--.

Signed and Sealed this

Seventh Day of December, 1993

*Attest:*

BRUCE LEHMAN

*Attesting Officer*     *Commissioner of Patents and Trademarks*